(12) United States Patent
Hu et al.

(10) Patent No.: US 6,997,296 B2
(45) Date of Patent: Feb. 14, 2006

(54) GEAR COUPLER WITH A CONTROLLABLE ROLLER CLUTCH

(75) Inventors: Fuzheng Hu, Toronto (CA); David Mark Pascoe, Newmarket (CA)

(73) Assignee: Magna Powertrain Inc., Concord (CA)

( * ) Notice: Subject to any disclaimer, the term of this patent is extended or adjusted under 35 U.S.C. 154(b) by 0 days.

(21) Appl. No.: 10/732,766

(22) Filed: Dec. 10, 2003

(65) Prior Publication Data

US 2004/0144610 A1   Jul. 29, 2004

Related U.S. Application Data

(60) Provisional application No. 60/432,365, filed on Dec. 10, 2002.

(51) Int. Cl.
*F16D 15/00* (2006.01)

(52) U.S. Cl. .......................................... 192/44; 192/47
(58) Field of Classification Search .................. 192/35, 192/44, 47, 84.7, 93 A
See application file for complete search history.

(56) References Cited

U.S. PATENT DOCUMENTS

| 4,230,211 A | * | 10/1980 | Goto et al. ................... 192/35 |
| 4,296,848 A | * | 10/1981 | Kagata et al. ................ 192/35 |
| 6,332,519 B1 | | 12/2001 | Roberts |
| 6,550,594 B1 | * | 4/2003 | Peura .......................... 192/44 |
| 6,814,198 B2 | * | 11/2004 | Pascoe ......................... 192/38 |

* cited by examiner

*Primary Examiner*—Saul Rodriguez
(74) *Attorney, Agent, or Firm*—Clark Hill PLC

(57) ABSTRACT

A gear coupler for a power transmission comprises an outer race having an cylindrical inner surface and an inner race having a cylindrical outer surface with spaced apart ramped surfaces. A plurality of rollers are seated between the inner and outer race. A controllable cage has a plurality of cage pins seated between adjacent pairs of rollers and engages the rollers with the ramped surfaces. A shifting ring is coupled to the cage for axial movement therealong for selectively aligning the rollers between the ramped surfaces to disengage the inner race from the outer race and allow relative rotation therebetween and for wedging the rollers against the ramped surface to engage the inner race with the outer race and prevent relative rotation therebetween in response to varying rotational speeds of the inner and outer race.

6 Claims, 5 Drawing Sheets

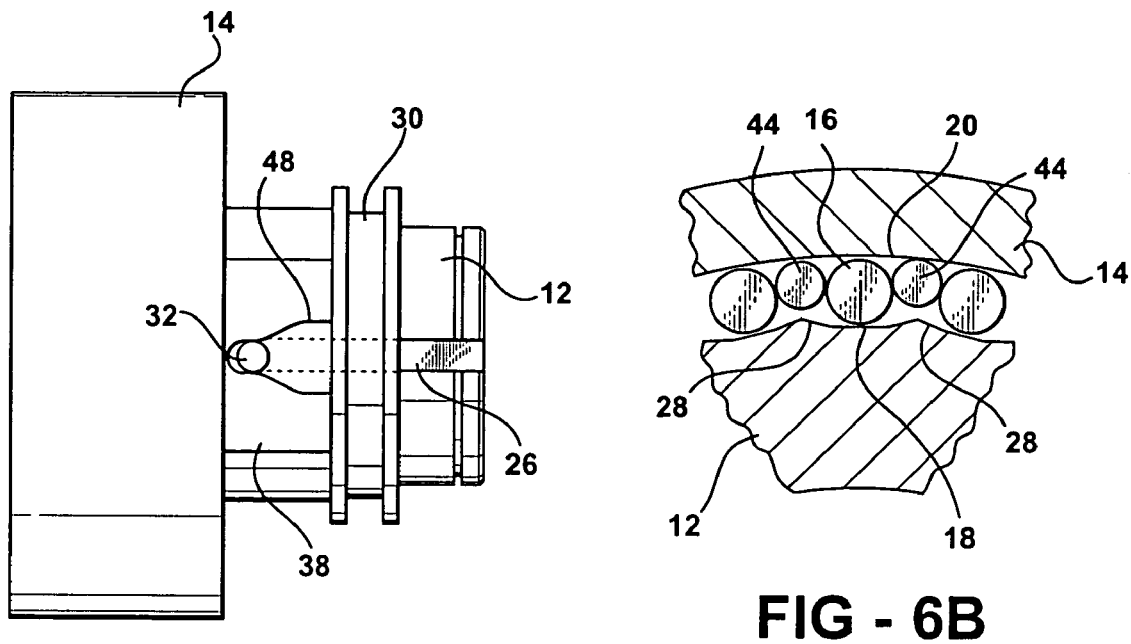
FIG - 6A
FIG - 6B
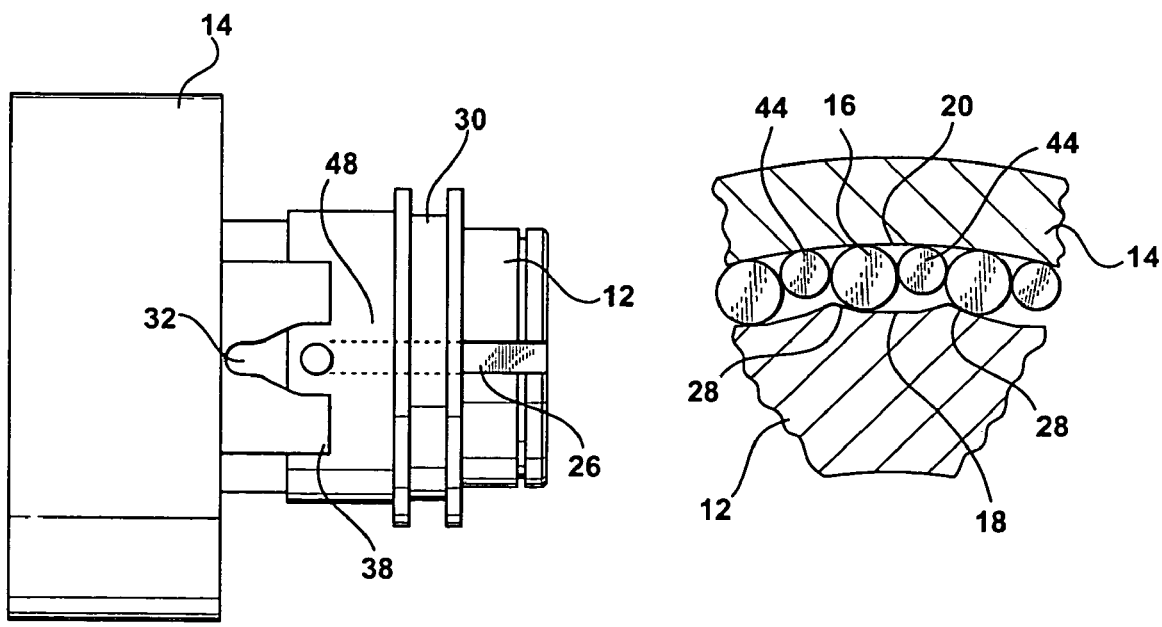
FIG - 7A
FIG - 7B

US 6,997,296 B2

GEAR COUPLER WITH A CONTROLLABLE ROLLER CLUTCH

RELATED APPLICATION

This application claims priority to and all benefits of U.S. Provisional Application No. 60/432,365, filed Dec. 10, 2002.

BACKGROUND OF THE INVENTION

1. Field of Invention

The subject invention relates to a gear coupler for a powered automotive transmission.

2. Description of the Related Art

Automotive power transmissions typically include a dog clutch with a synchronizer for changing speeds in a manual transmission or a disk clutch with discs made of frictional materials for changing speeds in an automatic transmission. These dog clutches and disk clutches are widely applied to engage or disengage two power transmission gears or shafts. These clutches are commonly referred to as gear couplers and are comparatively complicated in construction and expensive to manufacture. Therefore, it is desirable to provide a cost-effective, simplified and efficient gear coupler for power transmissions utilizing a roller clutch which can engage and disengage two power transmission shafts.

SUMMARY OF THE INVENTION

According to one aspect of the invention there is provided a gear coupler for a power transmission comprising an outer race having an cylindrical inner surface and an inner race having a cylindrical outer surface with spaced apart ramped surfaces. A plurality of rollers are seated between the inner and outer race. A controllable cage having a plurality of cage pins seated between adjacent pairs of rollers engages the rollers with the ramped surfaces. A shifting ring is coupled to the cage for axial movement therealong for selectively aligning the rollers between the ramped surfaces to disengage the inner race from the outer race and allow relative rotation therebetween and for wedging the rollers against the ramped surface to engage the inner race with the outer race and prevent relative rotation therebetween in response to varying rotational speeds of the inner and outer race.

BRIEF DESCRIPTION OF THE DRAWINGS

Advantages of the present invention will be readily appreciated as the same becomes better understood by reference to the following detailed description when considered in connection with the accompanying drawings wherein:

FIG. 2b is a cross-sectional view taken along line A—A of FIG. 2a;

FIG. 3b is a cross-sectional view taken along line B—B of FIG. 3a;

FIG. 6a is a side view of the inner race and outer race disengaged;

FIG. 6b is a fragmentary view of the cage with the inner race and outer race disengaged;

FIG. 7a is a side view of the inner race and outer race engaged; and

FIG. 7b is a fragmentary view of the cage with the inner race and outer race engaged.

DETAILED DESCRIPTION OF THE PREFERRED EMBODIMENT

Figure 1:
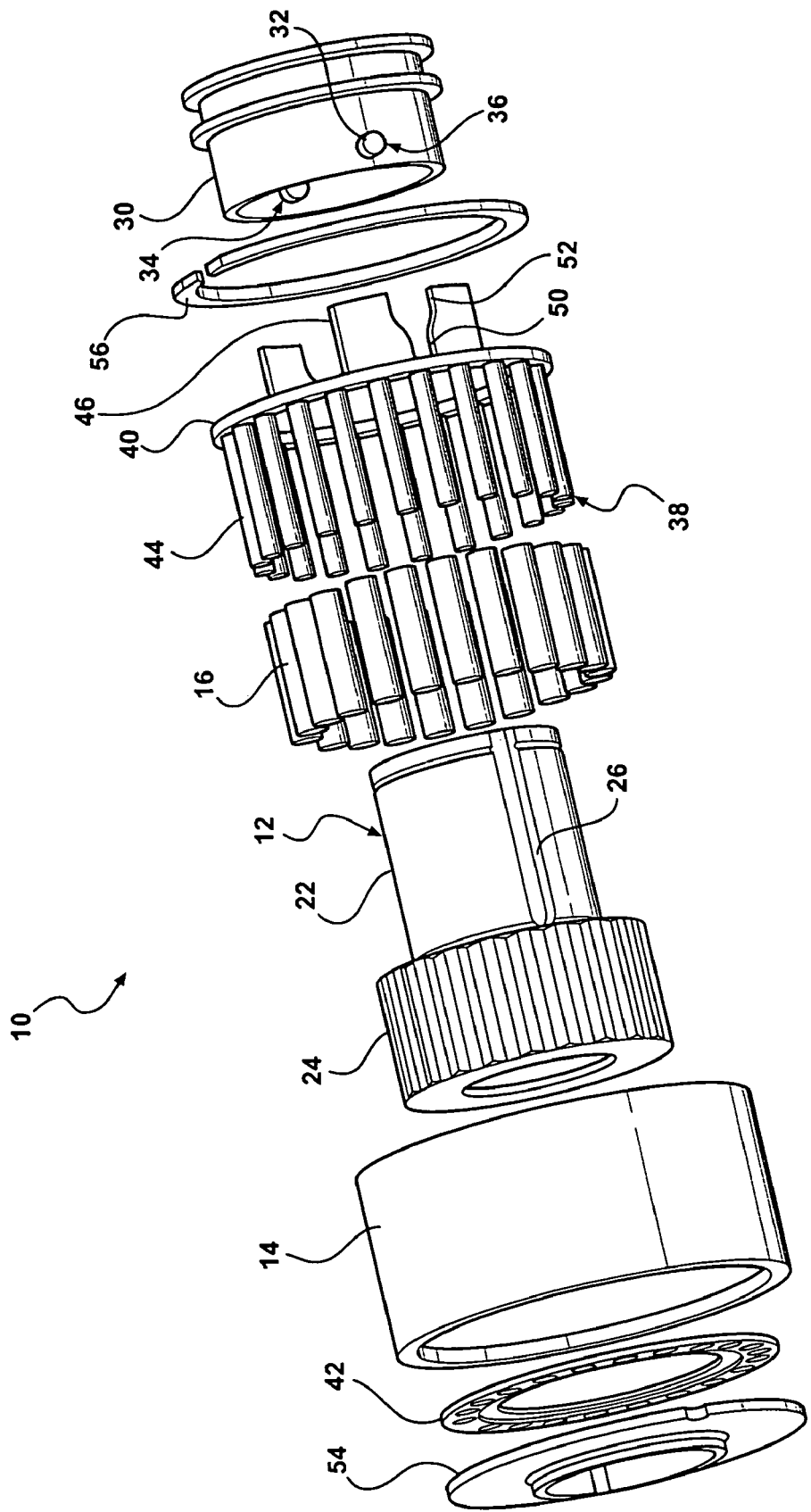
FIG. 1 is an exploded view of a gear coupler according to one aspect of the invention.
Figure 2A:
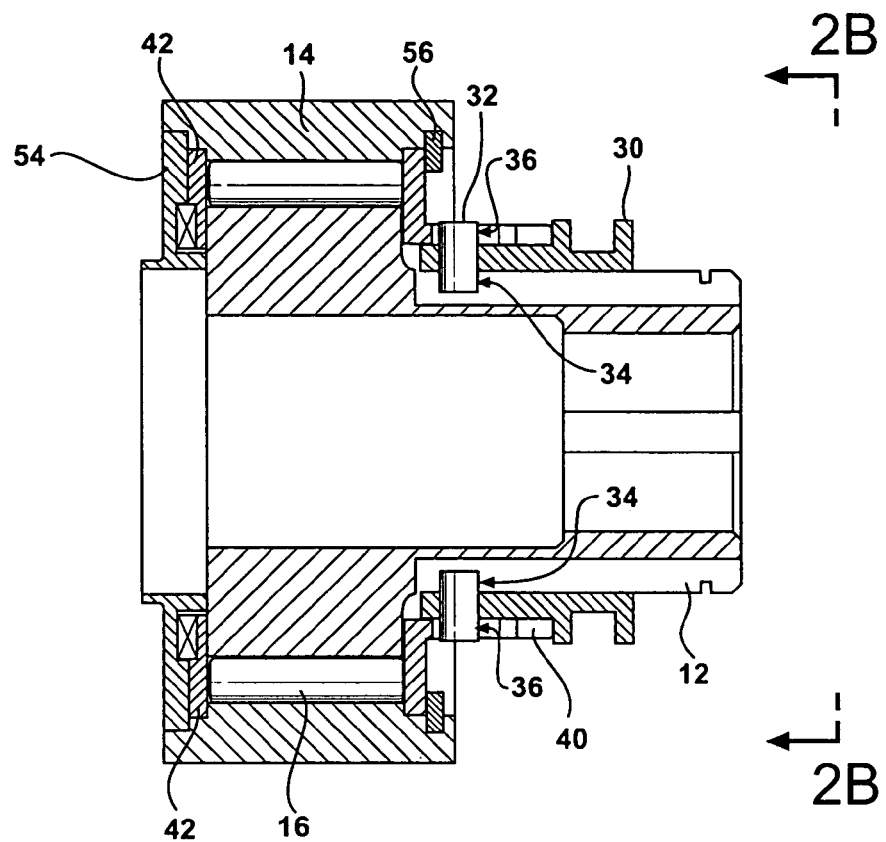
FIG. 2a is an end view of the gear coupler of FIG. 1.
Figure 2B:
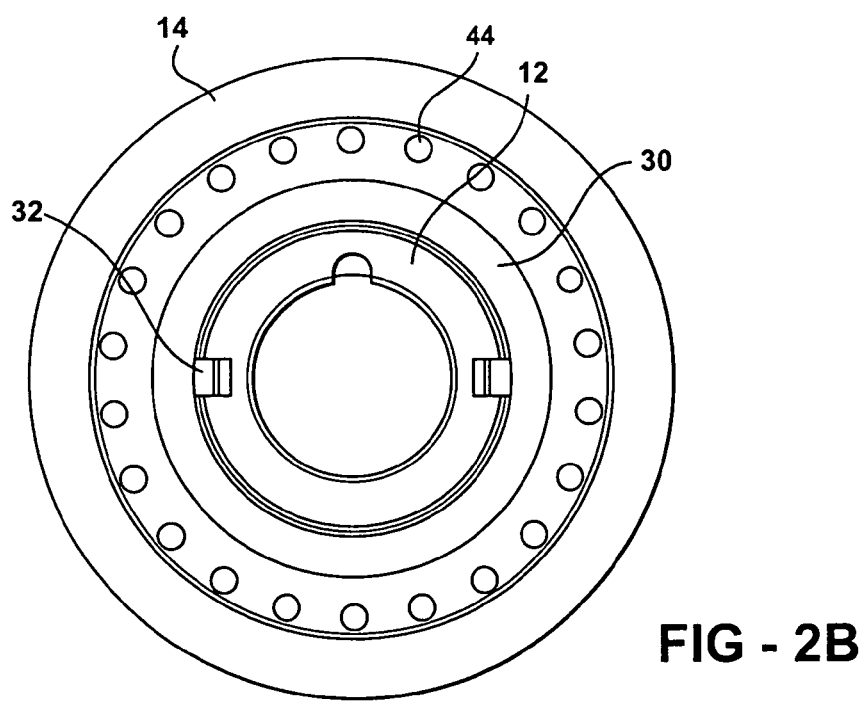
Figure 3A:
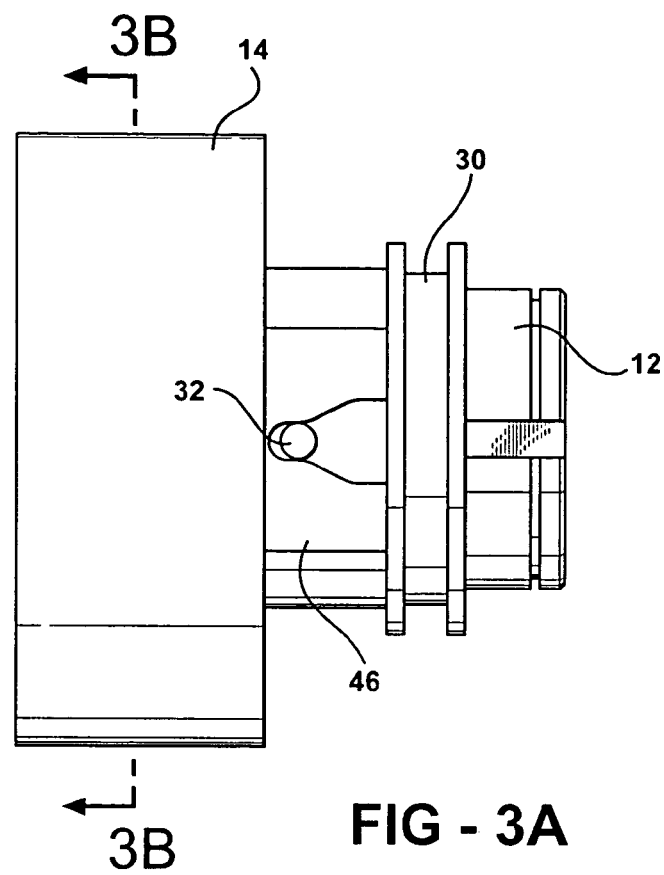
FIG. 3a is a side view of the gear coupler.
Figure 3B:
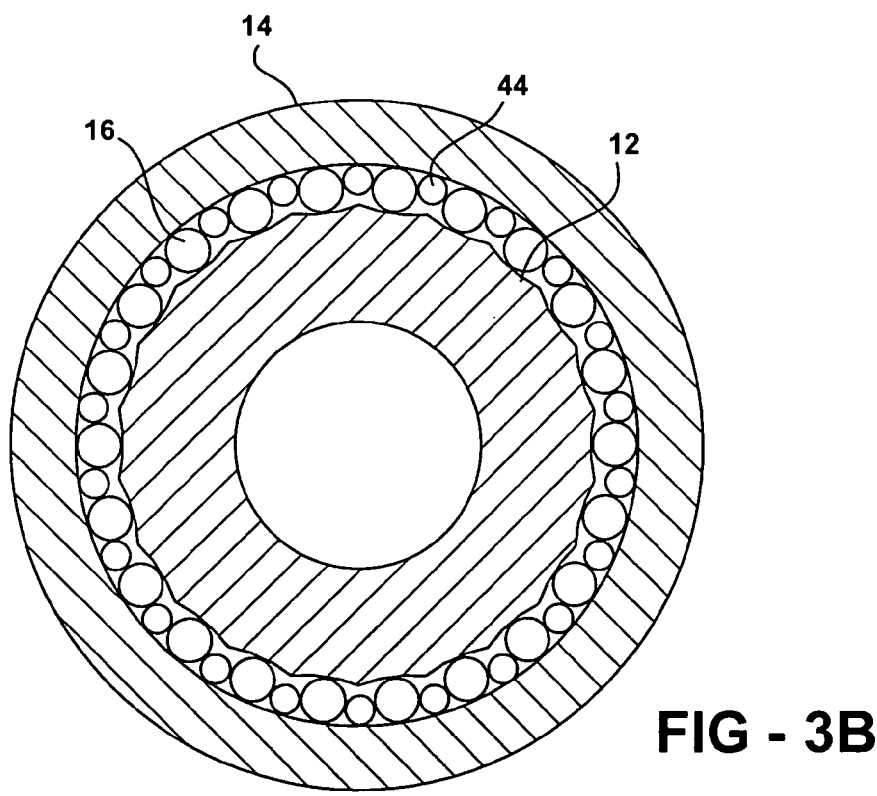

Referring to FIG. 1, the subject invention relates to a gear coupler generally shown at 10 for use with a rolling clutch and shifting mechanism of a power transmission. The gear coupler 10 comprises an inner race 12, an outer race 14, and a plurality of elongated rollers 16 for reducing friction between the inner 12 and outer 14 races. In the preferred embodiment, the inner race 12 includes a cylindrical outer surface 18, while the outer race 14 includes a cylindrical inner surface 20, as shown in FIGS. 6b and 7b. It should be noted, however, that the invention described herein could be practiced using an inner race 12 and an outer race 14 of other shapes. Additionally, while the preferred embodiment contemplates cylindrical rollers 16, the rollers 16 need not be cylindrical for the invention to operate. Indeed, any type of friction reducing mechanism known in the art may be used to accomplish the same inventive concept.

The inner race 12 comprises a slotted portion 22 and a support portion 24. A slot 26 is formed in the slotted portion 22 for aligning the inner race 12 as described below. The support portion 24 includes a plurality of ramped surfaces 28 disposed about the cylindrical surface 18 in a spaced arrangement such that a portion of the cylindrical surface 18 lies between each two adjacent ramped surfaces 28, as shown in FIGS. 6b and 7b.

The gear coupler 10 further comprises a shifting ring 30 for moving the inner race 12 and the outer race 14 between an engaged condition and a disengaged condition. Two shifting pins 32, each pin 32 including an interior end 34 and an exterior end 36, extend through the shifting ring 30 for aligning the shifting ring 30 and the inner race 12. In the preferred embodiment, the interior ends 34 of the shifting pins 32 fit within the slots 26 on the slotted portion 22 of the inner race 12. However, any portion of the pins 32 may contact the inner race 12 to effect the alignment of the shifting ring 30 and the inner race 12.

Figure 4:
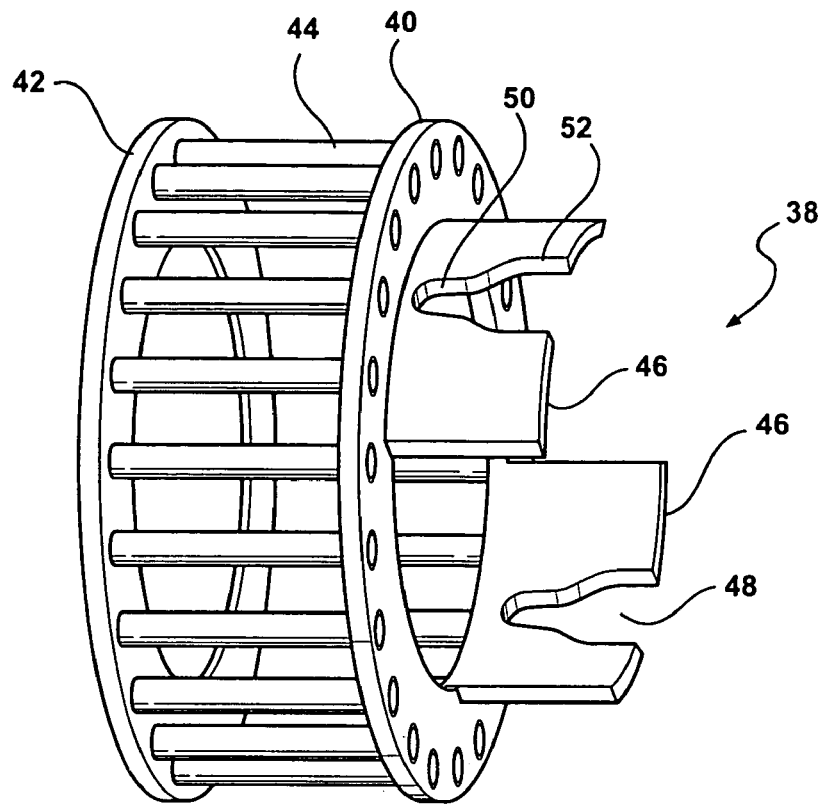
FIG. 4 is an assembled view of the controllable cage of FIG. 1.

The gear coupler 10 further comprises a controllable roller cage 38 comprising a cage ring 40, a cage plate 42, and a plurality of elongated, cylindrical, spaced apart cage pins 44 extending between the cage ring 40 and the cage plate 42. As with the rollers 4, the cage pins 44 need not be cylindrical for the invention to operate. As best shown in FIG. 4, the roller cage 38 further comprises a pair of cam plates 46 longitudinally extending from the cage ring 40. Each plate 46 includes a cam notch 48 for receiving one of the shifting pins 32 to align the cage 38 with the inner race 12 and the shifting ring 30. In the preferred embodiment, the exterior ends 36 of the pins 32 seat within the cam notches 48. However, any portion of the pins 32 may seat within the cam notches 48 to align the cage 38 and the shifting ring 30. Each cam notch 48 comprises a lower section 50 having a diameter essentially equal to the diameter of the pins 32, and an upper section 52 having a diameter larger than the pins 32.

The gear coupler 10 finally comprises an end cap 54 preferably seated within the outer race 14 just beyond the cage plate 42 and a retaining ring 56 seated between the shifting ring 30 and the cage ring 40.

Figure 5:
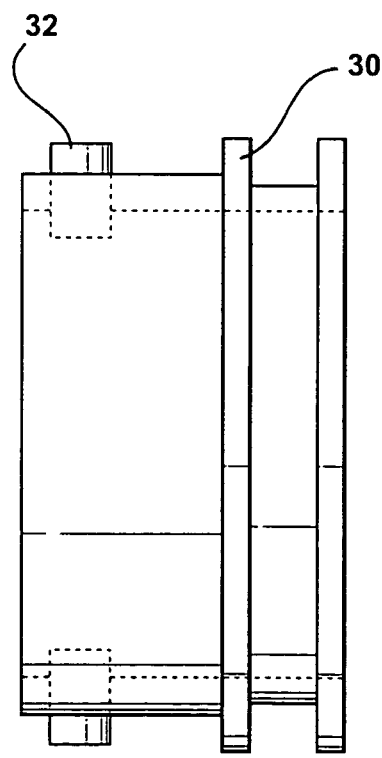
FIG. 5 is a side view of the shifting ring of FIG. 1.

As shown in FIG. 5, the two shifting pins 32 are tightly fitted into the shifting ring 30, preferably through openings formed within the shifting ring 5, although the pins 32 may be continuous with the shifting ring 30. The shifting pins 32 acts a cam followers in the cam notches 48 to translate linear, or axial, displacement of the shifting ring 30 into angular, or rotational, displacement of the cage 38. Specifically, when the pins 32 are seated in the lower section 50 of the cam notches 48, the angular movement of the pins 32 is limited, and therefore, the shifting ring 30, the cage 38 and the inner race 12 are also unable to rotate. As the shifting ring 30, and thus the pins 32, are moved axially, the shifting ring 30 shifts in a longitudinal direction, allowing the pins 32 to travel along the cam notches 48 to the upper sections 52. The larger diameter of the upper sections 52 allows angular movement of the shifting ring 30, the cage 38 and the inner race 12.

Referring to FIGS. 3a, 3b, 6a, 6b, 7a and 7b, the cage pins 44 and rollers 16 are alternatingly arranged between the inner race 12 and the outer race 14. A disengaged condition, wherein the inner race 12 and the outer race 14 are not in engagement with one another, exists when the shifting pins 32 are seated in the bottom section of the cam notches 48. In this condition, the rollers 16 rest atop the cylindrical surface 18 between adjacent ramped surfaces 28 and are free to rotate between the inner race 12 and the outer race 14. Since the pins 32 are unable to rotate, the shifting ring 30, the cage 38 and the inner race 12 are similarly restrained, and the rollers 16 maintain their position atop the cylindrical surface 18.

An engaged condition is created by actuation of the shifting ring 30. When the shifting ring 30 is actuated into axial movement, the pins 32 follow along the cam notches 48 to reach the upper sections 52 of the cam notches 48, thereby translating the displacement of the shifting ring 30 into rotational displacement of the cage 38. The cage 38 then rotates freely about the inner race 12. Rotation of the cage 38 may occur through inertia, through the application of a frictional drag torque from a wave spring, or through any other means known in the art. As the cage 38 rotates, the cage pins 44 attached thereto also rotate. As the cage pins 44 contact the rollers 16, and the rollers 16 move around the inner race 12 to contact the ramped surfaces 28 on the cylindrical surface 18. The rollers 16 then become wedged between the cylindrical surface 20 and the ramped surfaces 28, thereby engaging the inner race 12 and the outer race 14 when the races 12, 14 rotate at different speeds.

Therefore, by axially shifting the shifting ring 30, the inner race 12 and the outer race 14 are moved from a disengaged condition to an engaged condition, dependent upon the position of the shifting ring 30, for operation of the gear coupler 10. It should be appreciated that the shifting ring 30 can be actuated by mechanical or electromechanical mechanisms.

The invention has been described here in an illustrative manner, and it is to be understood that the terminology used is intended to be in the nature of words or description rather than limitation. For instance, the invention may be accomplished using only one pin 32, necessitating the use of only one cam plate 46 and associated cam notch 48, and only one slot 26. Furthermore, it should be appreciated that the invention may be practiced using only one roller 16 or one cage pin 44.

Many modifications and variations of the present invention are possible in light of the above teachings. It is, therefore, to be understood that within the scope of the appended claims, the invention may be practiced other than as specifically described herein.

What is claimed is:

1. A gear coupler for a power transmission comprising:
   an outer race having a cylindrical inner surface;
   an inner race having a cylindrical outer surface with spaced apart ramped surfaces, said inner race including a support portion defining said ramped surfaces and a slotted portion extending axially from said support portion and having a slot longitudinally disposed therealong;
   a plurality of rollers seated between said inner and outer race;
   a controllable cage having a plurality of cage pins alternately seated between adjacent pairs of rollers for engaging said rollers with said ramped surfaces, said cage including a cage ring spaced longitudinally from a cage plate and said rollers rotatably coupled therebetween and seated between said inner and outer race;
   a shifting ring coupled to said cage for axial movement therealong for selectively aligning said rollers between said ramped surfaces to disengage said inner race from said outer race and allow relative rotation therebetween and for wedging said rollers against said ramped surface to engage said inner race with said outer race and prevent relative rotation therebetween in response to varying rotational speeds of said inner and outer races, said shifting ring including a cylindrical center opening for axially receiving said slotted portion of said inner race therein and a shifting pin projecting radially therefrom and received in said longitudinal slot of said inner race; and
   said cage including a cam plate projecting longitudinally from said cage ring and said cam plate including a generally V-shaped cam notch for cooperating with said shifting pin a said shifting ring moves axially along said cage.

2. A gear coupler as set forth in claim 1 wherein said cam notch includes a lower section spaced to cage said shifting pin and prevent rotational movement therebetween and an upper contoured section spaced to allow rotation movement of said cage relative to said shifting ring, whereby said axial movement of said shifting ring relative to said cage to position said shifting pin in said lower section of said cam notch aligns said rollers between said ramped surfaces of said inner race to disengage and allow relative rotation between said inner and outer race and axial movement of said shifting ring to position said shifting pin in said upper section allows rotation of said cage to wedge said rollers against said ramped surface between said inner and outer race to prevent relative rotation therebetween.

3. A gear coupler for a power transmission, said gear coupler comprising:
   an inner race comprising a slotted section, said slotted section including a slot longitudinally disposed therealong;
   an outer race rotatably coupled to said inner race;
   a shifting ring for engaging said inner race and said outer race;
   a cage longitudinally disposed between said inner race and said outer race, said cage comprising a cage ring and a cam plate extending longitudinally from said cage ring;
   a cam notch disposed on said cam plate;
   a shifting pin positioned through said shifting ring such that said pin seats within said slot and said cam notch, thereby selectively aligning said shifting ring, said inner race and said cage, wherein said shifting pin follows along said cam notch in response to axial movement of said shifting ring to allow rotation of said cage about said inner race;

a plurality of rollers and a plurality of cage pins alternately disposed between said inner race disposed between said inner race and said outer race, said rollers being freely rotatable when said inner race and said outer race are disengaged for reducing friction therebetween and said cage pins extending longitudinally from said cage ring such that rotation of said cage rotates said cage pins around said inner race and rotation of said rollers around said inner race;

said inner race comprising a support section having a plurality of spaced apart ramped surfaces disposed thereon such that said rollers wedge between said ramped surface and said outer race to engage said inner race and said outer race;

said cage comprising a cage plate longitudinally spaced from said cage ring and resting with said outer race such that said cage pins extend longitudinally from said cage ring to said cage race; and an end cap disposed adjacent said cage ring and resting with said outer plate.

4. A gear coupler as set forth in claim 3 further comprising a retaining ring disposed between said shifting ring and said cage ring.

5. A gear coupler as set forth in claim 4 wherein said inner race further comprises a generally cylindrical outer surface.

6. A gear coupler as set forth in claim 5 wherein said outer race comprises a generally cylindrical inner surface.

* * * * *